Oct. 11, 1966 J. L. RASHLEIGH ET AL 3,278,914

MAGNETIC FILM STORAGE DEVICE

Filed Dec. 6, 1962

INVENTORS
JOHN L. RASHLEIGH
JOHN S. McMURTRIE
WILLIAM C. BAREHAM

BY J W Armbruster
ATTORNEY

United States Patent Office 3,278,914
Patented Oct. 11, 1966

3,278,914
MAGNETIC FILM STORAGE DEVICE
John L. Rashleigh and John S. McMurtrie, Poughkeepsie, and William C. Bareham, Wappingers Falls, N.Y., assignors to International Business Machines Corporation, New York, N.Y., a corporation of New York
Filed Dec. 6, 1962, Ser. No. 242,733
3 Claims. (Cl. 340—174)

This invention relates in general to magnetic thin film memories and more particularly to a method and means for non-destructively reading the information contained therein.

It is well known that a thin film of magnetic material, such as 80–20 Permalloy, having uniaxial anisotropy, will exhibit high speed rotational switching when subjected to partially coincident orthogonal drive fields comprising an easy axis field and a hard or transverse axis field. It is, furthermore, known that if a magnetic thin film is biased by means of a low level, D.C. magnetic field parallel to the hard axis of magnetization, the vectorial representation of the magnetization vector forms an acute angle with the easy axis of magnetization. Bias in this manner is commonly referred to as hard bias. Its use results in a decrease in the time required for the magnetization to reverse upon superimposition of orthogonal drive fields. However, in a hard biased nondestructive read, NDR, configuration problems arise out of the fact that $H_k$, the anisotropy field, will vary from element to element. $H_k$ is a measure of the minimum transverse field required to switch a film element from one remanent state to the other. If the film is to be nondestructively read, its magnetization is to be disturbed, but not switched. Accordingly, the transverse read field must be less than the minimum $H_k$ of the memory. At the same time it must be sufficiently large to create a usable read signal. The effect on this, combined with the hard bias is to limit the angle of disturbance of the magnetization vector. This makes the transverse read field a critical factor in the design of a magnetic thin film memory. Furthermore, while the transverse nondestructive read field is less than $H_k$ the field required for rotational switching is greater than $H_k$. This required that different currents be available for the write and read modes of operation.

It is, therefore, a primary object of this invention to provide a method of nondestructively reading a hard biased magnetic thin film wherein the transverse read field is not critical.

A further object of the present invention is the elimination of the need for different values of transverse field drive current.

Another object or feature of this invention resides in the use of a bipolar current source capable of supplying drive current in either direction through transverse field conductors. A further feature is the provision of bipolar currents that are of a single magnitude.

A particular object of the arrangement of the invention is that the magnetization vector in the nondestructive read mode of operation is disturbed in a non-critical direction and by an amount sufficient to provide a usable read signal.

The foregoing and other objects, features and advantages of the invention will be apparent from the following more particular description of the preferred embodiments of the invention, as illustrated in the accompanying drawings.

The subject matter is generally of the kind related to U.S. Patents 2,869,112; 2,970,291; 2,970,296; 3,019,125 and 3,030,612.

Figure 4:
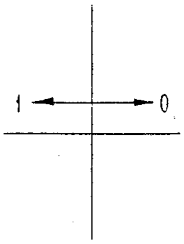
FIGURE 4 is a diagram showing the convention for stored data, as used in this specification.
Figure 5:
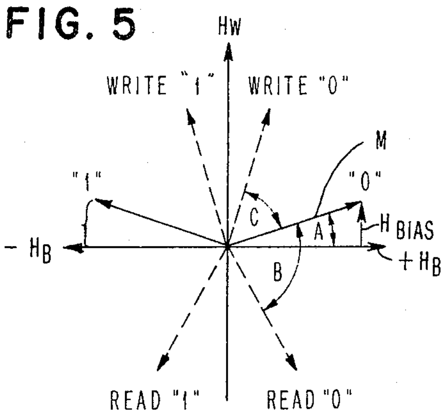
FIGURE 5 is a vector diagram showing the various positions and angles of rotation of the magnetization of a thin film.

In the rotational or orthogonal storage of binary data in a magnetic thin film, a magnetic field, hereinafter referred to as the word field and designated by $H_w$, FIGURE 5, is applied transverse to the easy axis of magnetization of the film element. In response, the magnetization which is the sum of the magnetic moments of the single domain thin film element, rotates into alignment with $H_w$. In partial coincidence with $H_w$, a second field, hereinafter referred to as the bit field or $H_B$ and characterized by the fact that it is of low amplitude and shorter in time duration than $H_w$, is directionally applied along the easy axis to force the rotated magnetization to relax into a desired state. In accord with the convention chosen for this invention, FIGURE 4 shows that a "1" is stored if the bit field is applied to the left and a "0" if the bit field is applied to the right.

In a typical magnetic thin film configuration, $H_w$ is unidirectional having been generated by a unidirectional current in a conductor supplied by a unipolar word field driver. A unipolar driver, as distinguished from a bipolar driver, generates a current in only one direction along a conductor. The bit field driver on the other hand, is bipolar and produces current selectively in either direction along a conductor. In FIGURE 5, $H_w$ is vectorially represented as a unidirectional arrow along the hard or vertical axis. $H_B$ is shown as a bidirectional arrow along the easy or horizontal axis. The magnetization is represented as a vector, M, which rotates either clockwise or counter-clockwise from is remanent position. If the word field driver is unipolar, such that $H_w$ has the direction shown in FIGURE 5, rotation of M is entirely above the horizontal axis. The foregoing is equally valid for a magnetic thin film memory configuration having an externally applied magnetic bias field parallel to the hard axis which improves the rotational switching speed of the memory.

As shown in FIGURE 5, if a bias field is applied along the hard axis and in the direction indicated by the arrow, the magnetization M will be caused to lie at some acute angle with respect to the easy axis. In the drawing, this angle is indicated as A and is proportional to the magnitude of the bias field. With a bias field thus applied, ordinarily orthogonal switching of the magnetic thin film may be carried out. In contrast to complete switching, it may be desirable to read a magnetic thin film memory nondestructively. This may be accomplished through appropriate amplitude control of the word field in a read mode where the magnetization is merely disturbed through a process known as "incoherent rotation." The applied word field is insufficient to cause complete rotation into the hard axis and upon the removal of the field, the magnetization returns to its previous remanent state, thereby retaining the information contained in the particular element. This requires that the driver selectively supply two values of current, one for complete switching and a lesser value for nondestructive read. A hard biased magnetic thin film may be read nondestructively in the same manner.

However, a problem arises due to the fact that the magnetic characteristics of thin films will vary from element to element in a complete matrix or array of a magnetic thin film memory. In particular, the constant $H_k$, which is a measure of the minimum word field required to effectively rotate M into the hard axis, is a precise constant for a particular element, but not for the plurality of elements such as in a complete memory. Thus, in the design of a nondestructively read magnetic thin film memory the effective word field cannot exceed the minimum $H_k$ of the memory. If the memory is biased in the hard direction, design for the word field can be critical since, while not exceeding the minimum $H_k$ it must provide for sufficient change in M to assure a usable read signal. Reliable operation demands that the effective word field be actually less than $H_k$, thereby permitting some design tolerance. In FIGURE 5 it is presumed that the maximum allowable, nondestructive read, word field will not effect angular rotation of M beyond the angle $A+C$. Accordingly, for a hard biased element, rotation of M does not exceed the angle C from its biased position. Depending upon the amount of bias, the angle C might be small. Sensing information contained in a magnetic thin film element, involves detecting the change in voltage along the easy axis brought about by a change in the projection of the magnetization M along that axis. For a small angle C, the change in the projection of the magnetization along the easy axis is small and the sensed voltage might well be too small to be reliably sensed. It is, therefore, obviously desirable to increase the magnitude of the sensed voltage without decreasing the biased angle A since to decrease A is to deny the speed advantage of a bias. Under ordinary circumstances this dilemma might result in a design compromise offering little improvement in speed and marginal reliability. The present invention provides an uncompromising solution by taking advantage of the fact that the magnetization can be disturbed from its biased position in a direction opposite to the direction of the bias. Generally, with reference to FIGURE 5 this results in the magnetization M being rotated from its biased position through an angle B.

Figure 2:
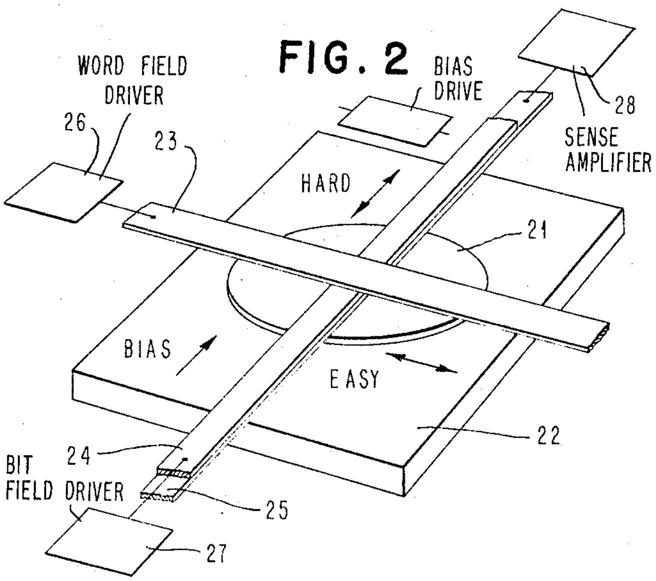
FIGURE 2 is a perspective view illustrating a flat or planar magnetic thin film element.

Applying this in a preferred arrangement, FIGURE 2, bi-polar word field driver 26 selectively drives current bidirectionally through a word conductor 23. Thus, a current in one direction will expose the magnetic thin film element 21 deposited on a suitable substrate 22 to a magnetic field in one direction along the indicated hard axis of magnetization. Reversing the current through conductor 23, reverses the field applied to the magnetic thin film element 21. Bi-polar bit field driver 27 provides a short time duration, low amplitude current bidirectionally in bit conductor 24. A current in one direction in conductor 24 results in the application of a bit field in the appropriate direction along the indicated easy axis of magnetization. Sense amplifier 28 connected to sense conductor 25, senses and amplifies any voltage induced in conductor 25 by a change in the easy axis field or field component lying along the easy axis. Magnetic thin film element 21 is, furthermore, exposed to an externally applied magnetic bias field as shown. This field is oriented along the hard axis of magnetization. With no excitation there exists a one to one correspondence between the indicated hard and easy axis of FIGURE 2 and the vertical, $H_w$, and horizontal, $H_B$, axis of FIGURE 5. Therefore, the magnetization M of thin film element 21 forms an acute angle with word conductor 23.

Figure 3:
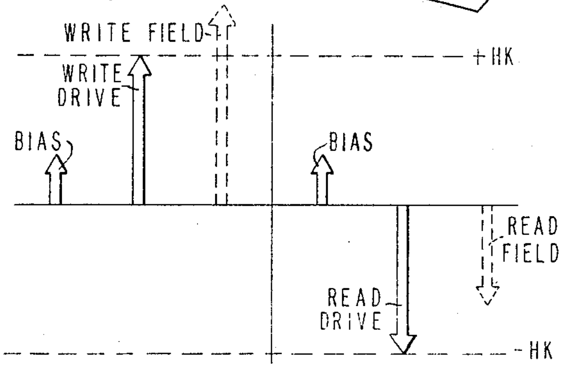
FIGURE 3 is a diagram showing the relative magnitudes and directions of applied and effective drive fields.
Figure 6:
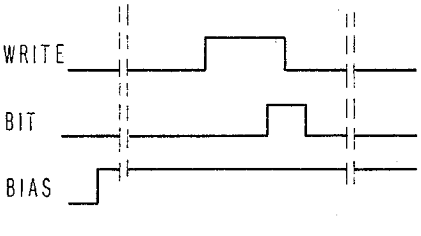
FIGURE 6 is a timing diagram for applied drive pulses.

Operationally, FIGURES 3 and 6 are referenced to describe the sequence of events resulting, first, in a bit of information being written into magnetic thin film element 21, and secondly, to the nondestructively reading of the bit in accordance with this invention. With reference to FIGURE 6, a write pulse is impressed on word conductor 23 by word field driver 26 resulting in a fringing field along the hard axis of magnetization. The magnitude of the field is indicated in FIGURE 3 by the vertical arrow designated WRITE DRIVE. Since the magnetic thin film element 21 is already biased, the write drive field is superimposed on the BIAS field of FIGURE 3 resulting in an effective switching field designated WRITE FIELD in FIGURE 3. Since the WRITE FIELD is in excess of $H_k$, the magnetization of magnetic thin film element 21 is rotated into alignment with the hard axis of magnetization, $H_w$ of FIGURE 5.

In partial coincidence with the write pulse, as shown on the second line of FIGURE 6, a bit pulse is impressed on bit conductor 24. Presuming that magnetic thin film element 21 contains a "0" and that a "1" is to be written, the bit field is in the direction of $-H_B$ of FIGURE 5 whereby M relaxes in a counter clockwise direction away from $+H_w$.

Figure 7:
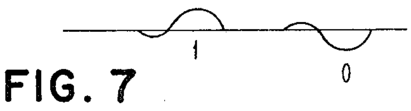
FIGURE 7 shows sensed waveforms.

In view of the bias, magnetization M forms an acute angle such as angle A with $-H_B$. It is now desired that magnetic thin film element 21 be nondestructively read in accord with the method of this invention. In the read mode, bit field driver 27 is not used and sense amplifier 28 is active. Word field driver 26 is energized to produce a relatively short duration current pulse in word conductor 23 in a direction such that the resulting word field is oppositely directed from the WRITE DRIVE arrow in FIGURE 3. This field is designated READ DRIVE in FIGURE 3. Since READ DRIVE is oppositely directed from the BIAS, the effective applied word field designated READ FIELD in FIGURE 3 is the vectorial sum of the READ DRIVE and the BIAS. It will be noted that the READ FIELD is less than $-H_k$, although the READ DRIVE or apparent field is equal to $H_k$. Applying the READ FIELD in FIGURE 5 causes magnetization M to rotate in a counter clockwise direction through an angle equal to the indicated angle B. The change in voltage along the easy axis induced in sense conductor 25 and amplified by sense amplifier 28 is a bipolar signal. Initially, the change of the component of magnetization M along the easy axis is a small increase in the negative voltage direction. This occurs as the magnetization M rotates counter clockwise through an angle A into alignment with $-H_B$. Thereafter, a larger change in the positive voltage direction occurs. The resulting sense signal is the left waveform shown in FIGURE 7. FIGURE 7, further shows that if "0" had been stored, the nondestructive read signal would have been oppositely phased from the "1" signal. It is to be noted, from the foregoing description, that during the write operation and the nondestructive read operation the magnitude of the word drive is the same.

Figure 1:
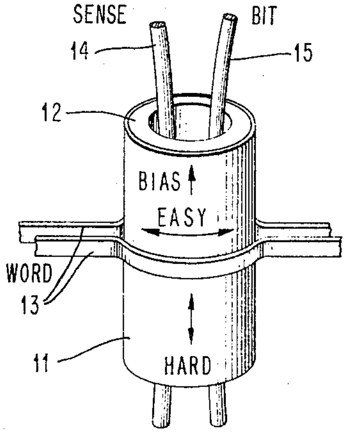
FIGURE 1 is a perspective view showing a cylindrical magnetic thin film element.

FIGURE 1 represents a hollow cylindrical magnetic thin film element comprising a magnetic thin film 11, having the usual characteristics of a hard and easy axis of magnetization, deposited on a suitable substrate 12. Word line 13 loops about the tubular element such that a word field is set up axially along the surface of the magnetic thin film 11 upon application of a word drive. A bit conductor 15 threads through the cylinder to provide a fringing bit circumferential to the axis of the cylinder. Sense conductor 14 also threads through the cylinder to sense any field or component thereof lying along the circumferential easy axis. Operation of the cylindrical thin film element is functionally the same as for the planar film element shown in FIGURE 2. It is, therefore, understood that bipolar word field and bit field drivers may be used in a hard baised configuration with the same advantages as heretofore described.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic film storage device comprising:

a sole oriented magnetic film having hard and easy directions of magnetization;

an electrical conductor means for producing a partial bias in said film in the hard direction;

means for producing bipolar easy axis bit fields in said film;

means for producing a writing word field in said film along the hard axis, polarized similarly to the bias, and totaling with the bias less than the saturation field, but sufficient field when aggregated with a bit field to accomplish switching;

means for producing a reading field in said film along the hard axis, polarized oppositely to the bias, and algebraically totaling with the bias less than the saturation field;

and a bipolar sensing means cooperating with said film to detect effects produced therein by said reading field producing means.

2. A magnetic storage device of the kind set forth in claim 1 wherein said reading field by said producing means may be of a noncritical magnitude and vary either way either above or below saturation strength and still net less than saturation effects:

whereby destructive reading is avoided.

3. A magnetic storage device of the kind set forth in claim 2 wherein said writing and reading fields may be of the same order of flux inducing magnitude and not critical as to the exact degree of such magnitude.

References Cited by the Examiner

UNITED STATES PATENTS

| | | | |
|---|---|---|---|
| 3,070,783 | 12/1962 | Pohm | 340—174 |
| 3,071,756 | 1/1963 | Pugh | 340—174 |
| 3,175,201 | 3/1965 | Solonczenski | 340—174 |
| 3,179,928 | 4/1965 | Sorensen | 340—174 |
| 3,195,108 | 7/1965 | Franck | 340—174 |

BERNARD KONICK, *Primary Examiner.*

IRVING SRAGOW, *Examiner.*

S. M. URYNOWICZ, *Assistant Examiner.*